United States Patent
Hegde (10) Patent No.: US 10,131,563 B2
(45) Date of Patent: *Nov. 20, 2018

(54) SUBMERGED COMBUSTION BURNERS

(71) Applicant: JOHNS MANVILLE, Denver, CO (US)

(72) Inventor: Subray R Hegde, Littleton, CO (US)

(73) Assignee: Johns Manville, Denver, CO (US)

( * ) Notice: Subject to any disclaimer, the term of this patent is extended or adjusted under 35 U.S.C. 154(b) by 317 days.

This patent is subject to a terminal disclaimer.

(21) Appl. No.: 14/778,206

(22) PCT Filed: May 22, 2013

(86) PCT No.: PCT/US2013/042182
§ 371 (c)(1),
(2) Date: Sep. 18, 2015

(87) PCT Pub. No.: WO2014/189504
PCT Pub. Date: Nov. 27, 2014

(65) Prior Publication Data
US 2016/0194232 A1   Jul. 7, 2016

(51) Int. Cl.
*C03B 5/235* (2006.01)
*F23D 14/22* (2006.01)
(Continued)

(52) U.S. Cl.
CPC .......... *C03B 5/2356* (2013.01); *C03B 5/2353* (2013.01); *F23D 14/22* (2013.01);
(Continued)

(58) Field of Classification Search
CPC . C03B 5/2356; C03B 5/2353; C03B 2211/22; C03B 2211/60; F23D 14/22;
(Continued)

(56) References Cited

U.S. PATENT DOCUMENTS

| | | |
|---|---|---|
| 1,706,857 A | 3/1929 | Mathe |
| 2,174,533 A | 10/1939 | See et al. |

(Continued)

FOREIGN PATENT DOCUMENTS

| | | |
|---|---|---|
| CN | 202329916 U | 7/2012 |
| DE | 37 10 244 A1 | 6/1989 |

(Continued)

OTHER PUBLICATIONS

"Glass Technologies—The Legacy of a Successful Public-Private Partnership", 2007, U.S. Department of Energy, pp. 1-32.
(Continued)

*Primary Examiner* — Queenie S Dehghan
(74) *Attorney, Agent, or Firm* — Robert D. Touslee (57) ABSTRACT

Submerged combustion burners having a burner body and a burner tip connected thereto. The burner body has an external conduit and first and second internal conduits substantially concentric therewith, forming first and second annuli for passing a cooling fluid therethrough. A burner tip body is connected to the burner body at ends of the external and second internal conduits. The burner tip includes a generally central flow passage for a combustible mixture, the flow passage defined by an inner wall of the burner tip. The burner tip further has an outer wall and a crown connecting the inner and outer walls. The inner and outer walls, and the crown are comprised of same or different materials having greater corrosion and/or fatigue resistance than at least the external burner conduit.

16 Claims, 4 Drawing Sheets

(51) Int. Cl.
  *F23D 14/76* (2006.01)
  *F23D 14/78* (2006.01)

(52) U.S. Cl.
  CPC .............. *F23D 14/76* (2013.01); *F23D 14/78* (2013.01); *C03B 2211/22* (2013.01); *C03B 2211/60* (2013.01); *F23D 2212/20* (2013.01); *F23D 2213/00* (2013.01); *F23D 2900/00018* (2013.01)

(58) Field of Classification Search
  CPC ...... F23D 14/76; F23D 14/78; F23D 2212/20; F23D 2213/00; F23D 2900/00018
  See application file for complete search history.

(56) References Cited

U.S. PATENT DOCUMENTS

| | | |
|---|---|---|
| 2,118,479 A | 1/1940 | McCaskey |
| 2,269,459 A | 1/1942 | Kleist |
| 2,321,480 A | 6/1943 | Gaskell |
| 2,432,942 A | 12/1947 | See et al. |
| 2,455,907 A | 1/1948 | Slayter |
| 2,679,749 A | 6/1954 | Poole |
| 2,718,096 A | 9/1955 | Henry et al. |
| 2,773,545 A | 12/1956 | Petersen |
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,248,205 A | 4/1966 | Dolf et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,339,616 A | 5/1967 | Ward, Jr. et al. |
| 3,325,298 A | 6/1967 | Brown |
| 3,347,660 A | 10/1967 | Smith et al. |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,421,873 A | 1/1969 | Burgman et al. |
| 3,432,399 A | 3/1969 | Schutt |
| 3,445,214 A | 5/1969 | Oremesher |
| 3,498,779 A | 3/1970 | Hathaway |
| 3,510,393 A | 5/1970 | Burgman et al. |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,097,028 A | 6/1978 | Langhammer |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,323,718 A | 4/1982 | Buhring et al. |
| 4,349,376 A | 9/1982 | Dunn et al. |
| 4,406,683 A | 9/1983 | Demarest |
| 4,413,882 A | 11/1983 | Bailey et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,919,700 A | 4/1990 | Pecoraro et al. |
| 4,927,886 A | 5/1990 | Backderf et al. |
| 4,953,376 A | 9/1990 | Merlone |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,286 A | 9/1995 | Snyder et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,595,703 A | 1/1997 | Swaeiens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |

(56) References Cited

U.S. PATENT DOCUMENTS

| | | |
|---|---|---|
| 5,718,741 A | 2/1998 | Hull et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,507 A | 8/1999 | Feldermann |
| 5,944,864 A | 8/1999 | Hull et al. |
| 5,950,929 A * | 9/1999 | Collier ............ F23D 11/36 239/397.5 |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillippe et al. |
| 6,071,116 A | 6/2000 | Phillippe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,025,862 B2 * | 4/2006 | Herchen ............ C25D 17/06 204/199 |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 8,707,739 B2 | 4/2014 | Huber et al. |
| 9,096,453 B2 | 8/2015 | Charbonneau |
| 9,670,844 B1 * | 6/2017 | Wilkins, Jr. ............ F02C 7/141 |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2003/0075843 A1 | 4/2003 | Wunsche |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0026099 A1 | 2/2005 | Masi et al. |
| 2005/0039491 A1 | 2/2005 | Maugendre et al. |
| 2005/0083989 A1 | 4/2005 | Leister et al. |
| 2005/0103323 A1 | 5/2005 | Engdahl |
| 2005/0236747 A1 | 10/2005 | Rue et al. |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2007/0246869 A1 | 10/2007 | Rymarchyk et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |

(56) References Cited

U.S. PATENT DOCUMENTS

| | | |
|---|---|---|
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0077135 A1 | 3/2012 | Charbonneau |
| 2012/0132725 A1 | 5/2012 | Dinu |
| 2012/0122490 A1 | 9/2012 | Cole et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0137051 A1 | 5/2013 | Beyer et al. |
| 2013/0283861 A1 | 10/2013 | Mobley et al. |

FOREIGN PATENT DOCUMENTS

| | | |
|---|---|---|
| DE | 196 19 919 A1 | 8/1997 |
| DE | 100 29 983 C2 | 9/2003 |
| DE | 103 27 201 A1 | 1/2005 |
| DE | 10 2005 033330 B3 | 8/2006 |
| DE | 10 2008 006572 A1 | 7/2009 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 1 986 966 B1 | 4/2010 |
| EP | 1 667 934 B1 | 2/2011 |
| FR | 2 740 860 A1 | 9/1997 |
| GB | 191301772 | 1/1914 |
| GB | 191407633 | 3/1914 |
| GB | 164073 A | 5/1921 |
| IT | 1208172 | 7/1989 |
| JP | S58 199728 A | 11/1983 |
| JP | S61 9901 7 A | 5/1986 |
| RO | 114827 | 7/1999 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2010147188 A1 | 12/2010 |

OTHER PUBLICATIONS

"Glass Melting Technology—A Technical and Economic Assessment," 2004, U.S. Department of Energy, pp. 1-292.

Rue, "Energy-Efficient Glass Melting—The Next Generation Melter", Gas Technology Institute, Project No. 20621 Final Report (2008).

"Glass Industry of the Future", United States Department of Energy, report 02-GA50113-03, pp. 1-17; Sep. 30, 2008.

Furman, BJ, ME 120 Experimental Methods Vibration Measurement, San Jose University Department of Mechanical and Aerospace Engineering.

Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.

Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

Oblain, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.

* cited by examiner

SUBMERGED COMBUSTION BURNERS

BACKGROUND INFORMATION

Technical Field

The present disclosure relates generally to the field of combustion burners and methods of use, and more specifically to burners, submerged combustion melters, and methods of their use, particularly for melting glass-forming materials.

Background Art

A submerged combustion melter (SCM) may be employed to melt glass batch and/or waste glass materials to produce molten glass by passing oxygen, oxygen-enriched mixtures, or air along with a liquid, gaseous and/or particulate fuel (some of which may be in the glass-forming materials), directly into a molten pool of glass, usually through burners submerged in a glass melt pool. The introduction of high flow rates of products of combustion of the oxidant and fuel into the molten glass, and the expansion of the gases during submerged combustion (SC), cause rapid melting of the glass batch and much turbulence and foaming.

In the context of SCMs, SC burners are predominately water-cooled, nozzle mix designs and may avoid premixing of oxidant and fuel for safety reasons due to the increased reactivity of using oxygen as the oxidant versus air. One currently used submerged combustion burner employs a smooth exterior surface, half-toroid metallic burner tip of the same or similar material as the remainder of the burner. When using such burners in an SCM for the manufacture of glass, the burner tip is placed in an extreme environment. The burner tip is exposed to corrosive combustion gases, high temperature glass contact, internal pressure from water or other coolant, vaporization of coolant within the burner tip, thermal cycling, and the like. As a result, it has been determined that thermal fatigue resistance, high melting point, high temperature corrosion/oxidation resistance, high temperature structural strength, and ability to join/fabricate are some of the key requirements for designing next generation SC burners.

Due to these requirements, noble metal alloys have become the focus. However, being expensive alloys, it is not presently economical to fabricate the entire burner using these materials. Because of this, a new challenge has emerged, and it would be an advance in the submerged combustion art to join the noble metal alloys to common structural materials such as stainless steels and Nickel-based alloys without sacrificing other concerns, such as good mechanical strength, coolant leak proofing, and noble metal recovery.

SUMMARY

In accordance with the present disclosure, submerged combustion (SC) burners are described that may reduce or eliminate problems with known SC burners, melters, and methods of using the melters to produce molten glass.

A fluid-cooled burner comprising:
a burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, the external conduit (10) and first internal conduit (12) forming a first annulus (11) for passing a cooling fluid there between, and a second internal conduit (14) substantially concentric with, and positioned internal of the first internal conduit (12), the second internal conduit (14) comprising a first end, a second end, and a longitudinal bore having a longitudinal axis, and configured to form a second annulus (13) between the first and second internal conduits (12, 14), the burner body comprising fuel and oxidant inlet ports near the second ends of the conduits; and a formed, one-piece, integral burner tip (4) defined by an inner wall (28), an outer wall (30), and a crown (32), the outer wall (30) removably fixed to the first end of the external conduit (10) via an outer connection, and the inner wall (28) removably fixed to the first end of the second internal conduit (14) via an inner connection, the formed, one-piece, integral burner tip (4) comprising a generally central flow passage configured to pass a combustible mixture therethrough, the generally central flow passage defined by the inner wall (28), the formed, one-piece, integral burner tip (4) comprising a corrosion resistant and fatigue resistant material, at least one of the corrosion and/or fatigue resistance being greater than material comprising the external conduit (10) under conditions experienced during submerged combustion melting of glass-forming materials.

Submerged combustion melters (SCM) comprising at least one fluid-cooled burner of this disclosure, and methods of producing molten glass in the SCMs, are considered aspects of this disclosure. Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

Burners, melters, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

It is to be noted, however, that the appended drawings are schematic in nature, may not be to scale, and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed SC burners, SCMs, and methods. However, it will be understood by those skilled in the art that the apparatus and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to present SC burners employing a metallic burner tip of the same or similar material as the remainder of the burner is that, when using such burners in an SCM for the manufacture of glass, the burner tip is placed in an extreme environment. Using noble metals and alloys for burner tips presents the additional challenge of attaching the burner tip to the base metal of the remainder of the burner. The present application is devoted to resolving this challenge without sacrificing other concerns, such as good mechanical strength, coolant leak proofing, and noble metal recovery.

Various terms are used throughout this disclosure. "Submerged" as used herein means that combustion gases emanate from combustion burners under the level of the molten glass; the burners may be floor-mounted, wall-mounted, or in melter embodiments comprising more than one submerged combustion burner, any combination thereof (for example, two floor mounted burners and one wall mounted burner). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels.

"Oxidant" as used herein includes air and gases having the same molar concentration of oxygen as air, oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Burner tips may comprise noble metals and/or other exotic corrosion and/or fatigue-resistant materials, such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal. In certain embodiments the burner tip may comprise an 80 wt. percent platinum/20 wt. percent rhodium alloy attached to the base metal conduits comprising the burner body using lap joints and brazing, welding or soldering of certain regions of the lap joints, as further explained herein.

When in alloyed form, alloys of two or more noble metals may have any range of noble metals. For example, alloys of two noble metals may have a range of about 0.01 to about 99.99 percent of a first noble metal and 99.99 to 0.01 percent of a second noble metal. Any and all ranges in between 0 and 99.99 percent first noble metal and 99.99 and 0 percent second noble metal are considered within the present disclosure, including 0 to about 99 percent of first noble metal; 0 to about 98 percent; 0 to about 97 percent; 0 to about 96; 0 to about 95; 0 to about 90; 0 to about 80; 0 to about 75; 0 to about 70; 0 to about 65; 0 to about 60; 0 to about 55; 0 to about 50; 0 to about 45, 0 to about 40; 0 to about 35; 0 to about 30; 0 to about 25; 0 to about 20; 0 to about 19; 0 to about 18; 0 to about 17; 0 to about 16; 0 to about 15; 0 to about 14; 0 to about 13; 0 to about 12; 0 to about 11; 0 to about 10; 0 to about 9; 0 to about 8; 0 to about 7; 0 to about 6; 0 to about 5; 0 to about 4; 0 to about 3; 0 to about 2; 0 to about 1; and 0 to about 0.5 percent of a first noble metal; with the balance comprising a second noble metal, or consisting essentially of a second noble metal (for example with one or more base metals present at no more than about 10 percent, or no more than about 9 percent base metal, or no more than about 8, or about 7, or about 6, or about 5, or about 4, or about 3, or about 2, or no more than about 1 percent base metal).

In certain noble metal alloy embodiments comprising three or more noble metals, the percentages of each individual noble metal may range from equal amounts of all noble metals in the composition (about 33.33 percent of each), to compositions comprising, or consisting essentially of, 0.01 percent of a first noble metal, 0.01 percent of a second noble metal, and 99.98 percent of a third noble metal. Any and all ranges in between about 33.33 percent of each, and 0.01 percent of a first noble metal, 0.01 percent of a second noble metal, and 99.98 percent of a third noble metal, are considered within the present disclosure.

The choice of a particular material is dictated among other parameters by the chemistry, pressure, and temperature of fuel and oxidant used and type of glass melt to be produced. The skilled artisan, having knowledge of the particular application, pressures, temperatures, and available materials, will be able design the most cost effective, safe, and operable burners for each particular application without undue experimentation.

The terms "corrosion resistant" and "fatigue resistant" as used herein refer to two different failure mechanisms that may occur simultaneously, and it is theorized that these failure mechanisms may actually influence each other in profound ways. Preferably, burner tip material that will have a satisfactory service life of at least 12 months under conditions existing in a continuously operating SCM adjacent to the burner tip. As used herein the SCM may comprise a floor, a roof, and a sidewall structure connecting the floor and roof defining an internal space, at least a portion of the internal space comprising a melting zone, and one or more combustion burners in either the floor, the roof, the sidewall structure, or any two or more of these, producing combustion gases and configured to emit the combustion gases from a position under a level of, and positioned to transfer heat to and produce, a turbulent molten mass of glass containing bubbles in the melting zone.

Figure 1:
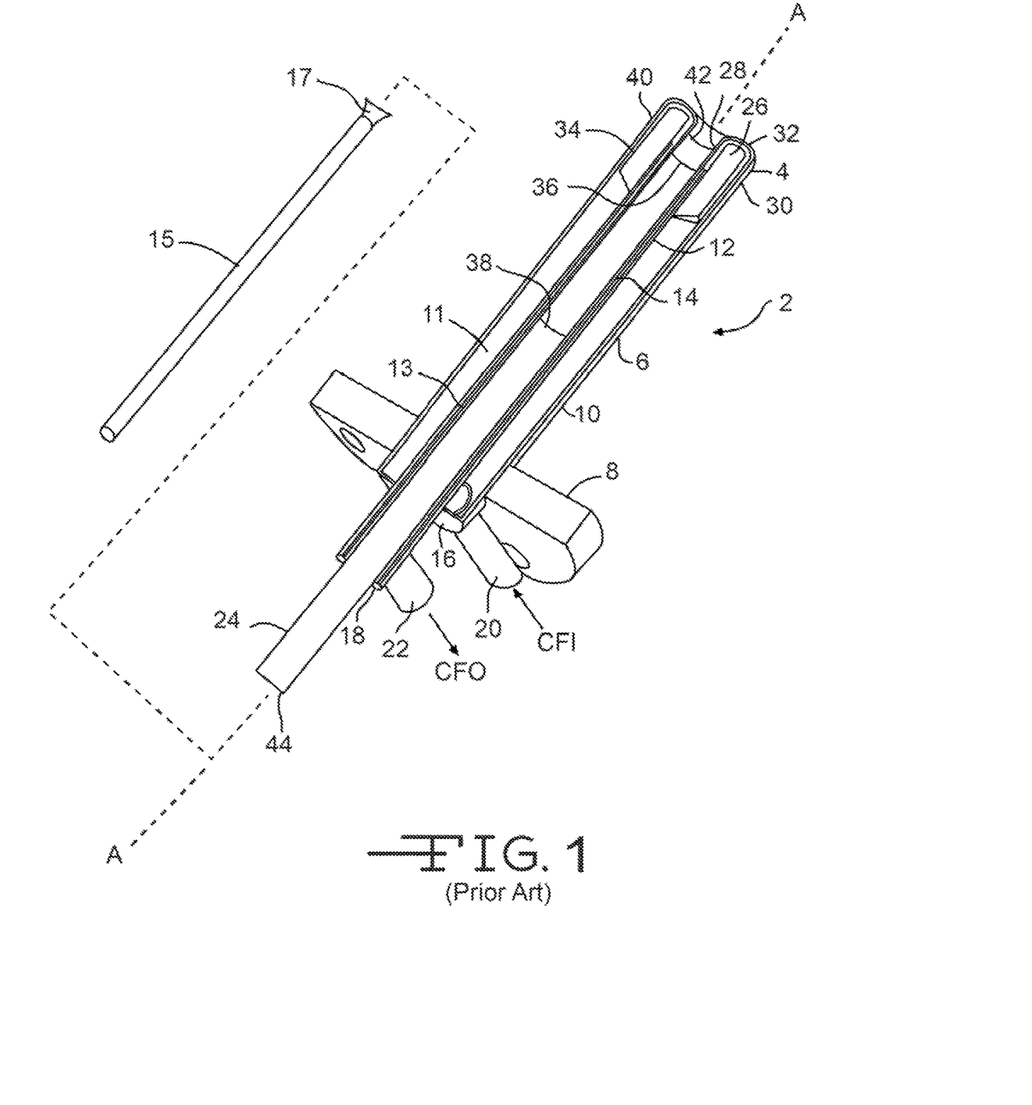
FIG. 1 is a longitudinal cross-section view of fluid-cooled portions of a prior art burner and burner tip, showing typical welded connections between conduits and the burner tip comprising similar mild steel or other base metals, and illustrating a central, substantially concentric fuel or oxidant conduit (not shown in other figures)

FIG. 1 illustrates schematically a prior art SC burner having a fluid-cooled portion 2 composed of a burner tip 4 attached to a burner body 6, the SC burner having a longitudinal axis "A" as indicated. A burner main flange 8 connects the burner to an SCM superstructure, not illustrated. Burner body 6 is comprised of an external conduit 10, a first internal conduit 12, a second internal conduit 14, and end plates 16, 18. A coolant fluid inlet conduit 20 is provided, along with a coolant fluid exit conduit 22, allowing ingress of a cool coolant fluid as indicated by the arrow denoted "CFI", and warmed coolant fluid egress, as indicated by an arrow denoted "CFO", respectively. A first annulus 11 is thus formed between substantially concentric external conduit 10 and first internal conduit 12, and a second annulus 13 is formed between substantially concentric first and second internal conduits 12, 14. A proximal end 24 of second internal conduit 14 may be sized to allow insertion of a fuel or oxidant conduit 15 (depending on the burner arrangement), which may or may not include a distal end nozzle 17. When conduit 15 and optional nozzle 17 are inserted internal of second internal conduit 14, a third annulus is formed there between. In certain embodiments, oxidant flows through the third annulus, while one or more fuels flow through conduit 15, entering through a port 44. In certain other embodiments, one or more fuels flow through the third annulus, while oxidant flows through conduit 15, entering through port 44.

Still referring to FIG. 1, fluid-cooled portion 2 of the burner includes a ceramic or other material insert 26 fitted to the distal end of first internal conduit 12. Insert 26 has a shape similar to but smaller than burner tip 4, allowing coolant fluid to pass between burner tip 4 and insert 26, thus cooling burner tip 4. Burner tip 4 includes an inner wall 28, an outer wall 30, and a crown 32 connecting inner wall 28 and outer wall 30. In prior art burners, welds at locations 34 and 36, and optionally at 38, 40 and 42, connect burner tip 4 to external conduit 10 and second internal conduit 14, using conventional weld materials to weld together similar base metal parts, such as carbon steel, stainless steel, or titanium. Despite the use of coolant and even titanium (which ordinarily is considered quite corrosion-resistant), the operating life of burners as illustrated and described in relation to FIG. 1 are very limited in the SCM environment, where temperatures of molten glass may reach 1300° C., and the turbulence of the molten glass caused by the burners themselves as well as combustion gases contribute to form a highly erosive environment in contact with the burner tip.

It has now been discovered that a combination of careful selection of burner tip material and type of connections between the burner tip walls and conduits forming the burner body may significantly increase the operating life of SC burners used to melt glass-forming materials in an SCM. This disclosure in particular describes use of a formed, one-piece, integral burner tip removably fixed to the burner body, the formed, one-piece, integral burner tip comprising a corrosion resistant and fatigue resistant material, at least one of the corrosion and/or fatigue resistance being greater than material comprising the external conduit under conditions experienced during submerged combustion melting of glass-forming materials.

In certain embodiments the crown of the burner tip may include at least one physical convolution sufficient to increase surface area and fatigue resistance of the crown compared to a smooth, half-toroid crown of the same composition, as disclosed in Applicant's co-pending International Application Number PCT/US13/42159, filed on even date herewith.

Certain embodiments may comprise a burner tip insert shaped substantially the same as but smaller than the burner tip and positioned in an internal space defined by the burner tip, the insert configured so that a cooling fluid may pass between internal surfaces of the burner tip and an external surface of the insert. In these embodiments a first or distal end of the first internal conduit would be attached to the insert.

In certain embodiments, the crown and inner and outer walls of the burner tip body may extend beyond the first end of the first internal conduit, at least partially defining a mixing region for oxidant and fuel.

Specific non-limiting burner, burner tip, SCM and process embodiments in accordance with the present disclosure will now be presented in conjunction with FIGS. 2-6. The same or similar numerals are used for the same or similar features in the various figures. In the views illustrated in FIGS. 2-6, it will be understood in each case that the figures are schematic in nature, and certain conventional features are not illustrated in order to illustrate more clearly the key features of each embodiment.

Figure 2:
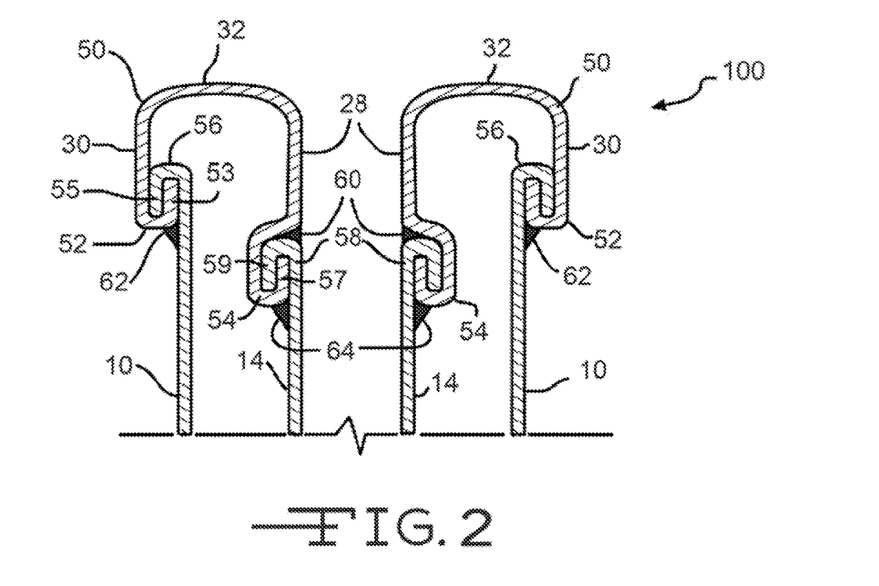
FIG. 2 is a longitudinal cross-sectional view of one non-limiting embodiment of fluid-cooled portions of an SC burner in accordance with the present disclosure.
Figure 3:
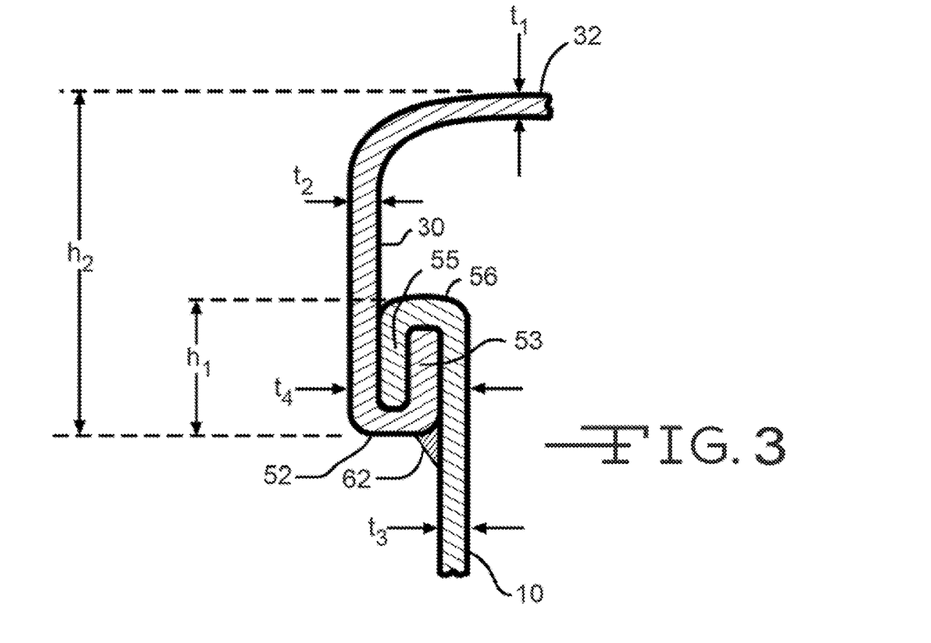
FIG. 3 is a detailed cross-sectional view of the burner of FIG. 2 illustrating various features described herein.
Figure 4A:
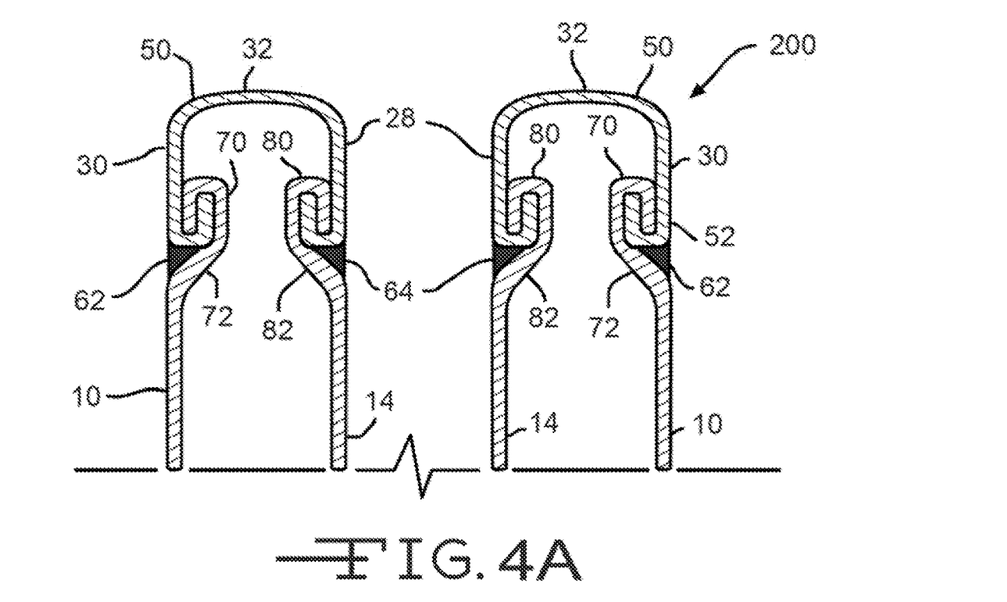
FIGS. 4A-B are longitudinal cross-sectional views of two non-limiting embodiments of fluid-cooled portions of an SC burner in accordance with the present disclosure.
Figure 4B:
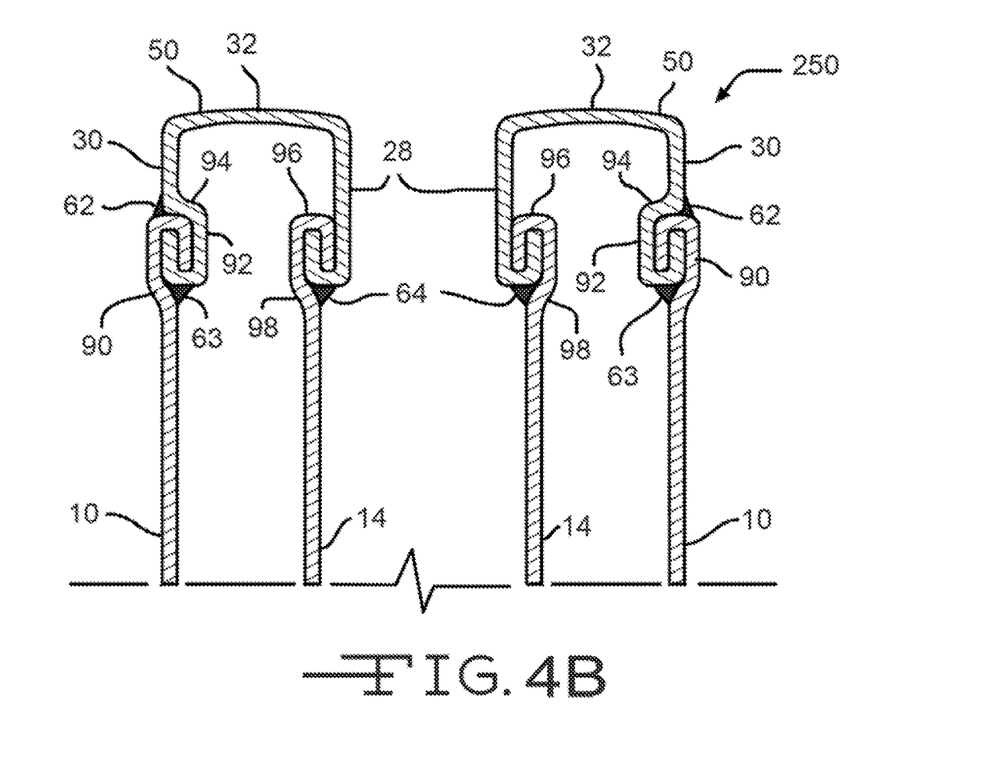

Referring now again to the figures, FIGS. 2-4 are schematic longitudinal cross-sectional views of non-limiting embodiments of fluid-cooled portions of various embodiments of SC burners in accordance with the present disclosure, with FIG. 3 being a detailed schematic cross-sectional view. Embodiment 100 illustrated schematically in FIG. 2 includes a formed, one-piece, integral Pt/Rh or other corrosion and fatigue resistant burner tip 50 removably connected to base metal conduits 10, 14. Burner tip 50 includes an outer edge portion 52 and an inner edge portion 54. Outer edge portion 52 includes an extension 53 forming a double lap joint with an extension 55 of a lapped end 56 of conduit 10 (as more clearly indicated in FIG. 3). Similarly, inner edge portion 54 includes an extension 57 forming a double lap joint with an extension 59 of lapped end 58 of conduit 14. Weld, solder, or braze areas may be added as indicated at 60, 62, and 64 for the purpose of strengthening and/or sealing the double lap joints.

Certain dimensions of a double lap joint useful in the burners of this disclosure are illustrated schematically in FIG. 3. Crown 32 may have a thickness "$t_1$"; outer wall 30 may have a thickness "$t_2$"; conduit 10 and may have a thickness "$t_3$"; and double lap joint formed by portions 30, 52, 53, 55, and 10 may have a thickness V. Thicknesses $t_1$, $t_2$, and $t_4$ may be expressed as variables in terms of $t_3$, where $t_3$ is the wall thickness of external conduit 10. In burners of the present disclosure, $t_3$ may range from about 1 mm to about 10 mm, or from about 1 mm to about 3 mm, or about 2 mm. Thickness $t_1$ may range from about $0.5t_3$ to about $1t_3$, and $t_2$ may range from about $1t_3$ to about $2t_3$. For example, using $t_3$=2 mm, thickness $t_1$ and may range from about 1 mm to about 2 mm, and $t_2$ may range from 2 mm to about 4 mm. Thickness $t_4$ may then range from the lowest value of $2t_2+2t_3$, to the highest value of $2t_2+2t_3$, or from about 4 mm to about 12 mm.

Heights "$h_1$" and "$h_2$" are also illustrated in FIG. 3. Heights $h_1$ and $h_2$ may also be expressed as variables in terms of thickness $t_3$. Using this reference, $h_1$ may range from about $2t_3$ to about $10t_3$, and $h_2$ may range from about $2h_1$ to about $10h_1$. For example, if $t_3$=2 mm, then $h_1$ would range from about 4 mm to about 20 mm, and $h_2$ would range from about 8 mm to about 200 mm.

FIGS. 4A-B are longitudinal cross-sectional views of two non-limiting embodiments 200 and 250 of fluid-cooled portions of an SC burner in accordance with the present disclosure. Embodiment 200 differs from embodiment 100 in that lapped end 70 of conduit 10 includes an angled portion 72, and lapped end 80 of conduit 14 includes an angled portion 82, as illustrated. Another difference is that both of the lapped ends of walls 28, 30 of the burner tip are folded inward, and lapped ends 70, 80 of conduits 10, 14 are folded away from each other. Yet another difference is the presence of only two welded, soldered, or brazed areas 62, 64. Embodiment 250 differs from embodiments 100 and 200 by having the lapped ends of conduits 10, 14 folded inward, toward the burner longitudinal axis. Lapped end 90 of conduit 10 and lapped end 92 of burner tip outer wall 30 form an outer double lap joint, with an angled portion 94. An inner double lap joint is formed by lapped ends inner wall 28 and conduit 14, with lapped end 96 of conduit 14 including an angled portion 98. In embodiment 250, there may be three welded, soldered, or brazed regions 62, 63, and 64.

Figure 5:
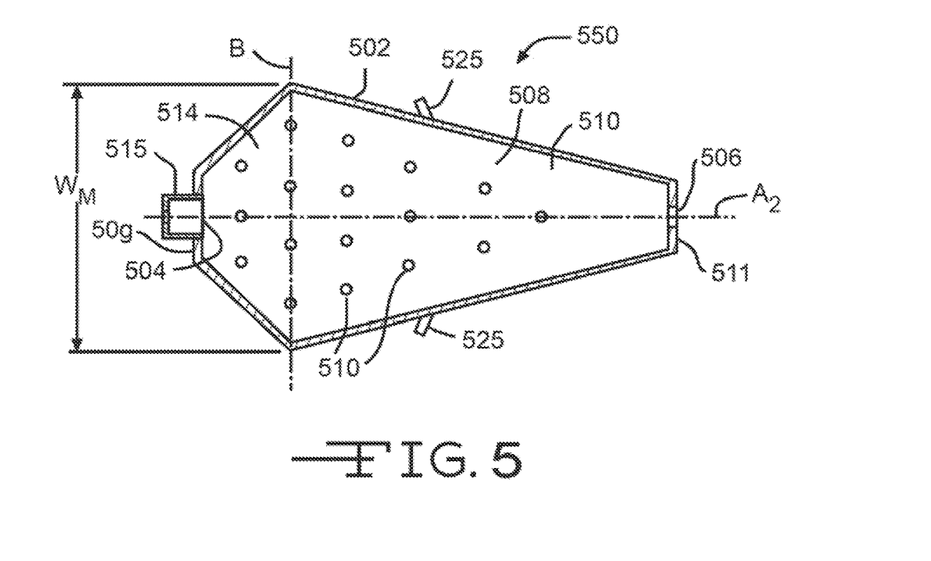
FIG. 5 is a schematic cross-sectional view of an SCM in accordance with the present disclosure.

FIG. 5 is a cross-sectional view of an SCM embodiment 550 in accordance with the present disclosure. Embodiment 550 of FIG. 5 comprises a peripheral wall 502 of melter 550, wall 502 having an inlet 504, a batch feed chute 515, and a melter discharge 506 through which molten glass exits the melter. Melter 550 also comprises a roof (not illustrated), a floor 8, a feed end 9, and a discharge end 11.

Melter wall 502 forms an expanding melting zone 514 formed by a first trapezoidal region, and a narrowing melting zone 516 formed by a second trapezoidal region of wall 502. The first trapezoid forming expanding melting zone 514 and the second trapezoid forming narrowing melting zone 516 share a common base in this embodiment, indicated at B, at an intermediate location between the melter inlet 504 and discharge 506. Common base B defines the location of the maximum width, $W_M$, of melter 550. The primary importance of these melting zones is that no 90-degree corners are present in the melter where there may be stagnation of molten glass flow. While this is preferred, other shaped melters may benefit from use of the burners of the present disclosure, and the present disclosure is not limited to SCMs having shape of embodiment 550.

Melter 550 includes submerged combustion burners 510. In embodiment 550, burners 510 are floor-mounted burners, illustrated in rows substantially perpendicular to the longitudinal axis, $A_2$, of melter 550. In certain embodiments, burners 510 are positioned to emit combustion products into molten glass in the melting zones 514, 516 in a fashion so that the gases penetrate the melt generally perpendicularly to the floor. In other embodiments, one or more burners 510 may emit combustion products into the melt at an angle to the floor, where the angle may be more or less than 45 degrees, but in certain embodiments may be 30 degrees, or 40 degrees, or 50 degrees, or 60 degrees, or 70 degrees, or 80 degrees.

Melter apparatus in accordance with the present disclosure may also comprise one or more wall-mounted submerged combustion burners, as indicated at 525 in FIG. 5, and/or one or more roof-mounted burners (not illustrated). Roof-mounted burners may be useful to pre-heat the melter apparatus melting zones 514, 516, and serve as ignition sources for one or more submerged combustion burners 510. Melter apparatus having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners 510. In certain embodiments, if there is a possibility of carryover of batch particles to the exhaust, one or more roof-mounted burners could be used to form a curtain to prevent particulate carryover. In certain embodiments, all submerged combustion burners 510 are oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain embodiments, in certain melter zones.

Suitable materials for glass-contact refractory, which may be present in SC melters and downstream flow channels, and refractory burner blocks (if used), include fused zirconia ($ZrO_2$), fused cast AZS (alumina-zirconia-silica), rebonded AZS, or fused cast alumina ($Al_2O_3$). The melter geometry and operating temperature, burner and burner tip geometry, and type of glass to be produced, may dictate the choice of a particular material, among other parameters.

The term "fluid-cooled" means use of a coolant fluid (heat transfer fluid) to transfer heat away from the burner exterior conduit and burner tip. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons.

Certain SCMs of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the SCM roof or the SCM wall structure, or both the SCM roof and SCM wall structure. Downstream flow channels may also comprise one or more non-submerged burners.

In certain SCMs, one or more burners in the SCM and/or flow channel(s) downstream thereof may be adjustable with respect to direction of flow of the combustion products. Adjustment may be via automatic, semi-automatic, or manual control. Certain system embodiments may comprise a burner mount that mounts the burner in the wall structure, roof, or floor of the SCM and/or flow channel comprising a refractory, or refractory-lined ball joint. Other burner mounts may comprise rails mounted in slots in the wall or roof. In yet other embodiments the burners may be mounted outside of the melter or channel, on supports that allow adjustment of the combustion products flow direction. Useable supports include those comprising ball joints, cradles, rails, and the like.

Certain SCMs and/or flow channels may employ one or more high momentum, non-submerged burners, for example, to impinge on portions of a foam layer. High momentum burners useful in apparatus, systems, and methods of this disclosure include those disclosed in Applicant's U.S. patent application Ser. No. 13/268,130, filed Oct. 7, 2011, now U.S. Pat. No. 9,021,838, issued May 5, 2015. As used herein the phrase "high momentum" combustion burners means burners configured to have a fuel velocity ranging from about 150 ft./second to about 1000 ft./second (about 46 meters/second to about 305 meters/second) and an oxidant velocity ranging from about 150 ft./second to about 1000 ft./second (about 46 meters/second to about 305 meters/second). As used herein the phrase "low momentum" combustion burners means burners configured to have a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Certain SCMs and method embodiments of this disclosure may include fluid-cooled panels such as disclosed in Applicant's U.S. patent application Ser. No. 12/817,754, filed Jun. 17, 2010, now U.S. Pat. No. 8,769,992, issued Jul. 8, 2014. In certain system and process embodiments, the SCM may include one or more adjustable flame submerged combustion burners comprising one or more oxy-fuel combustion burners, such as described in Applicant's U.S. patent application Ser. No. 13/268,028, filed Oct. 7, 2011, now U.S. Pat. No. 8,875,544, issued Nov. 4, 2014. In certain systems and processes, the SCM may comprise a melter exit structure designed to minimize impact of mechanical energy, such as described is Applicant's U.S. patent application Ser. No. 13/458,211, filed Apr. 27, 2012, now U.S. Pat. No. 9,145,319, issued Sep. 29, 2015. In certain systems and processes, the flow channel may comprise a series of sections, and may comprise one or more skimmers and/or impingement (high momentum) burners, such as described in Applicant's U.S. patent application Ser. No. 13/268,130, filed Oct. 7, 2011, now U.S. Pat. No. 9,021,838, issued May 5, 2015, and Ser. No. 13/493,170, filed Jun. 11, 2012, issued as U.S. Pat. No. 8,707,739, Apr. 29, 2014, reissue application Ser. No. 14/807,494, filed Jul. 23, 2015, now U.S. Pat. No. RE46,462, issued Jul. 4, 2017. Certain systems and processes of the present disclosure may utilize measurement and control schemes such as described in Applicant's U.S. patent application Ser. No. 13/493,219, filed Jun. 11, 2012, now U.S. Pat. No. 9,096,453, issued Aug. 4, 2015, and/or feed batch densification systems and methods as described in Applicant's U.S. patent application Ser. No. 13/540,704, filed Jul. 3, 2012, now U.S. Pat. No. 9,643,869, issued May 9, 2017. Certain SCMs and processes of the present disclosure may utilize devices for delivery of treating compositions such as disclosed in Applicant's U.S. patent application Ser. No. 13/633,998, filed Oct. 3, 2012, now U.S. Pat. No. 8,973,405, issued Mar. 10, 2015.

Certain SCMs and process embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain SCMs and processes of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a combustion controller which receives one or more input parameters selected from velocity of the fuel, velocity of oxidant, mass and/or volume flow rate of the fuel, mass and/or volume flow rate of oxidant, energy content of the fuel, temperature of the fuel as it enters the burner, temperature of the oxidant as it enters the burner, pressure of the oxidant entering the burner, humidity of the oxidant, burner geometry, oxidation ratio, temperature of the burner combustion products, temperature of melt, composition of bubbles and/or foam, and combinations thereof, and may employ a control algorithm to control combustion temperature, treatment composition flow rate or composition, based on one or more of these input parameters.

Figure 6:
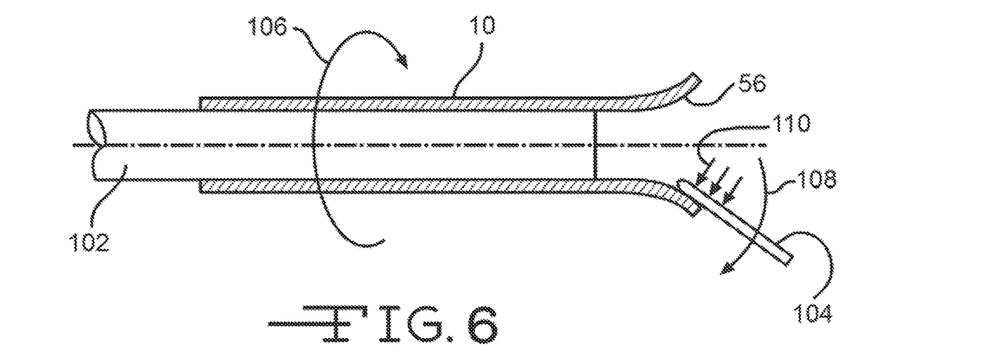
FIG. 6 is a schematic perspective view, partially in cross-section, of a spin-forming operation that may be used to form burner tips and lap joints of the present disclosure.

FIG. 6 is a schematic perspective view, partially in cross-section, of a spin-forming operation that may be used to form one-piece, integral burner tips and lap joints of the present disclosure. Other forming operations maybe employed, such as stamping. A steel bar 102 may be used as a support to rotate conduit 10 (or material for a burner tip) using a lathe or other rotation device, as indicated by the arrow 106. An end 56 of conduit 10 is illustrated being formed on one end with a lapped end using a mandrel 104 and downward pressure as indicated by arrows 110. Arrow 108 indicates the direction of orientation of mandrel 104 as the lap is formed into the shape 56 and 55 as indicated in FIG. 3. The ends of conduits and burner tip materials may be heated for softening to aid the spin forming process. Alternatively, an intermittent spinning with heating may be employed to relieve any work hardening. Spin forming is discussed in U.S. Pat. Nos. 6,694,791; 6,701,617; and 6,660,106. For thin metal pieces, such as noble metal burner tips, use of a pressurized bladder may be beneficial, such as discussed in U.S. Pat. No. 4,953,376, which discusses a process for necking-down a thin walled, deep drawn steel container.

Methods of producing molten glass using an SCM of this disclosure are considered another aspect of the disclosure. One embodiment may comprise flowing a fuel into the one or more fuel inlet ports and through a third annulus defined by the second internal conduit 14 and a central, concentric oxidant conduit 15. In these embodiments an oxidant flows into the one or more oxidant inlet ports and through the oxidant conduit 15, and the burner body and burner tip body are configured such that flow of oxidant out of the oxidant conduit and flow of fuel out of the third annulus causes the oxidant to intersect flow of the fuel in a mixing region at least partially defined by the generally central flow passage through the burner tip, combusting at least some of the fuel in the mixing region to form a flame and combustion products, and directing the flame and combustion products into solid and/or partially molten glass forming materials above the mixing region. Other method embodiments reverse the location of fuel and oxidant, with fuel flowing through the central third internal conduit and oxidant flowing through the third annulus.

In operation of burners and SCMs of the present disclosure, an inorganic glass-forming material is charged to the SCM. The mass flow rate of the inorganic material, for example glass-forming materials, is a function of the composition of the feed material, desired composition, viscosity, and temperature of the molten glass, the flame temperature of the burner(s), the burner geometry, for example burner exit, nozzle exit, and non-central passages sizes, the pressure in the mixing region of the burner, and other parameters. The process operating conditions are generally not independent values but have some degree of interaction. Oxygen-enhanced oxidant/fuel melting is markedly different than the traditional air-fuel melting processes. The general principle is to operate combustion in the mixing region of the burner in a manner that replaces some of the air with a separate source of oxygen. The overall combustion ratio may not change. The process of combining fuel and oxygen-enriched oxidant will, in most embodiments, primarily occur in the mixing region of the burners, after the gases have passed over a flame arrestor safety device. Varying the oxygen content of the oxidant can control the flame temperature of the combustion gases.

Certain burner embodiments may include an adjustable, changeable and removable structure or insert 17 removably attached to central conduit 15 (FIG. 1), such as described in Applicant's U.S. patent application Ser. No. 13/268,028, filed Oct. 7, 2011, now U.S. Pat. No. 8,875,544, issued Nov. 4, 2014. As used herein the word "changeable", when referring to a burner feature, means that that feature may be physically different from burner to burner by machining, molding, or spin forming, for example, while the term "adjustable" means that a feature of a burner may actually be varied without making physical modifications to the burner. Such adjustable, changeable and removable structures or inserts include a body that is adjustable in the sense that threads or other connectors allow variation of the axial position of the insert. Furthermore, physical parameters of such inserts may be changed, and the entire insert may be removed and replaced with another insert of same or different dimensions if desired.

Conduits of burner bodies and associated components (such as spacers and supports between conduits, but not burner tips) used in SC burners, SCMs and processes of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the conduit wall thickness required, reducing weight of the burners and/or space required for burners.

Brazing compounds and methods may be used to reinforced and/or seal one or more lap joints between burner tip 4 and burner body 6. Brazing allows the joining of dissimilar metals and also allows for repairs to be made by removing the braze material. For these embodiments to be successful, the mating surfaces must be parallel or substantially so, and of sufficient overlap to ensure that the brazing material can properly flow between the portions of the burner tip and burner body being joined. In certain embodiments brazing may be successfully achieved by making the burner tip walls 28, 30 and conduits 14, 10 overlap with sufficient gaps to allow brazing material to enter the gaps, or braze material may simply seal the lap joints or double lap joints.

Weld, solder, and braze compounds, sometimes referred to as weld, solder, and braze alloys, to be useful in embodiments of the present disclosure, must have liquidus and solidus temperatures above the highest temperature of the burner tip. The highest temperature of the burner tip will be a temperature equal to the melt temperature existing in the SCM reduced by the flow of coolant through the burner tip, as well as by the flow of combustion gases through the burner tip. The highest temperature of the burner tip during normal operating conditions depends on the type of glass being made, which makes the selection of weld, solder, or braze alloy not a simple matter. For Na—Ca—Si soda-lime window glass (Glass 1), typical melt temperature may range from about 1275° C. to about 1330° C.; for Al—Ca—Si E glass having low sodium and zero boron (Glass 2), the melt temperature may range from about 1395° C. to about 1450° C.; for B—Al—Si glass, zero sodium, zero potassium, high Si (Glass 3), the melt temperature may be about 1625° C.; and for B—Al—Ca—Si E glass used for reinforcement fiber (Glass 4), the melt temperature maybe about 1385° C. This information was taken from Rue, D., "*Energy Efficient Glass Melting—The Next Generation Melter*", p. 63, GTI Project Number 20621, March, 2008 (U.S. Dept. of Energy). Based on these temperatures, and assuming a drop in burner tip temperature of 300° C. due to coolant and gas flow through the burner tip, Table 1 lists the possible braze alloys that may be used.

TABLE 1

Braze Alloys

| Glass Type | Glass Melt T, (° C.) | Possible Braze Alloys[1] | Solidus T, (° C.)[2] |
|---|---|---|---|
| 1 | 1275-1330 | Pt | 1769 |
| | | Pd | 1555 |
| | | Ti | 1670 |
| | | Au/Pd (92/8, PALORO (BAU-8)) | 1200 |
| | | Ni/Pd (40/60, PALNI) Pd/Co (65/35, PALCO BPD-1) | 1238 1219 |
| | | Pd/Ni/Au (34/36/30, PALNIRO 4 (AMS-4785)) | 1135 |
| | | Cu | 1083 |
| | | Au | 1064 |
| 2 | 1395-1450 | Pt | 1769 |
| | | Pd | 1555 |
| | | Ti | 1670 |
| | | Au/Pd (92/8, PALORO (BAU-8)) | 1200 |
| | | Ni/Pd (40/60, PALNI) | 1238 |
| | | Pd/Co (65/35, PALCO BPD-1) | 1219 |

TABLE 1-continued

Braze Alloys

| Glass Type | Glass Melt T, (° C.) | Possible Braze Alloys[1] | Solidus T, (° C.)[2] |
|---|---|---|---|
| 3 | 1625 | Pt | 1769 |
|  |  | Ti | 1670 |
| 4 | 1385 | Pt | 1769 |
|  |  | Pd | 1555 |
|  |  | Ti | 1670 |
|  |  | Au/Pd (92/8, PALORO (BAU-8)) | 1200 |
|  |  | Ni/Pd (40/60, PALNI) | 1238 |
|  |  | Pd/Co (65/35, PALCO BPD-1) | 1219 |
|  |  | Pd/Ni/Au (34/36/30 PALNIRO 4 (AMS-4785)) | 1135 |

[1] PALORO, PALNI, and PALNIRO are registered trademarks, and PALCO is a trademark of Morgan Technical Ceramics and/or Morgan Advanced Ceramics, Inc.
[2] From Internet website of Morgan Technical Ceramics and The Morgan Crucible Company plc, England In general, central internal conduit 15 may have an inner diameter (ID) ranging from about 1 inch up to about 5 inches (2.5 cm to 13 cm), or from about 2 inches up to about 4 inches (5 cm to 10 cm), with other burner conduits sized accordingly.

The total quantities of fuel and oxidant used by burners of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2.

The velocity of the fuel in the various burner embodiments of the present disclosure depends on the burner geometry used, but generally is at least about 15 meters/second (m/s). The upper limit of fuel velocity depends primarily on the desired penetration of flame and/or combustion products into the glass melt and the geometry of the burner; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate. The pressure in mixing region 150 of burners in accordance with the present disclosure should not exceed about 10 psig (170 kPa absolute pressure).

Additionally, certain burner embodiments of this disclosure may also be provided with stabilization of the flame with an auxiliary injection of fuel and/or oxidant gases. For example, a portion of the oxidant may be premixed with fuel as a primary oxidant, usually air, in conduit 15, in addition to a secondary or tertiary oxidant injection in the third annulus.

SC burners and methods of the present disclosure are intended to be used, for example, to replace combustion burners in existing SCMs, and/or to be used as the main source of energy in new SCMs.

A combustion process control scheme may be employed. A master controller may be employed, but the disclosure is not so limited, as any combination of controllers could be used. The controller may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

The controller may utilize Model Predictive Control (MPC). MPC is an advanced multivariable control method for use in multiple input/multiple output (MIMO) systems. MPC computes a sequence of manipulated variable adjustments in order to optimise the future behavior of the process in question. It may be difficult to explicitly state stability of an MPC control scheme, and in certain embodiments of the present disclosure it may be necessary to use nonlinear MPC. In so-called advanced control of various systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A fluid-cooled combustion burner comprising:
a burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, the external conduit (10) and first internal conduit (12) forming a first annulus (11) for passing a cooling fluid there between, and a second internal conduit (14) substantially concentric with, and positioned internal of the first internal conduit (12), the second internal conduit (14) comprising a first end, a second end, and a longitudinal bore having a longitudinal axis, and configured to form a second annulus (13) between the first and second internal conduits (12, 14), the burner body comprising fuel and oxidant inlet ports near the second ends of the conduits; and
a spin-formed or stamp formed, one-piece, integral, corrosion resistant and fatigue resistant burner tip (50) defined by a corrosion resistant and fatigue resistant inner wall (28), a corrosion resistant and fatigue resistant outer wall (30), and a corrosion resistant and fatigue resistant crown (32), the corrosion resistant and fatigue resistant outer wall (30) removably fixed to the first end of the external conduit (10) via an outer spin-formed or stamped double lap joint, and the corrosion resistant and fatigue resistant inner wall (28) removably fixed to the first end of the second internal conduit (14) via an inner spin-formed or stamped double lap joint, the spin-formed or stamp formed, one-piece, integral, corrosion resistant and fatigue resistant burner tip (50) comprising a generally central flow passage configured to pass a combustible mixture therethrough, the generally central flow passage defined by the a corrosion resistant and fatigue resistant inner wall (28), at least one of the corrosion and/or fatigue resistance being greater than material comprising the external conduit (10) under conditions experienced during submerged combustion melting of glass-forming materials, wherein the outer spin-formed or stamped double lap joint includes the first end of the external conduit curved outwardly, and the inner spin-formed or stamped double lap joint includes the first end of the second internal conduit curved outwardly.

2. The fluid-cooled combustion burner of claim 1 wherein the inner spin-formed or stamped double lap joint comprises a first spin-formed or stamped inner lap joint portion of the corrosion resistant and fatigue resistant inner wall (28) of the spin-formed or stamp formed, one-piece, integral, corrosion resistant and fatigue resistant burner tip (50), and a second spin-formed or stamped inner lap joint portion of the second internal conduit comprising material having corrosion and fatigue resistance less than that of the corrosion resistant and fatigue resistant material of the first spin-formed or stamped inner lap joint portion.

3. The fluid-cooled combustion burner of claim 2 wherein the outer spin-formed or stamped double lap joint comprises a first spin-formed or stamped outer lap joint portion of the corrosion resistant and fatigue resistant outer wall (30) of the spin-formed or stamp formed, one-piece, integral, corrosion resistant and fatigue resistant burner tip (50), and a second spin-formed or stamped outer lap joint portion of the external conduit comprising material having corrosion and fatigue resistance less than that of the corrosion resistant and fatigue resistant material of the first spin-formed or stamped outer lap joint portion.

4. The fluid-cooled combustion burner of claim 3 wherein:
the first and second internal conduits and the external conduit comprise the same or different base materials selected from the group consisting of carbon steel, stainless steel, titanium, nickel-based alloys, and combinations and alloys of two or more of these; and
the spin-formed or stamp formed, one-piece integral, corrosion resistant and fatigue resistant burner tip inner and outer walls and crown comprise the same or different materials selected from the group consisting of noble metals, alloys of two or more noble metals, alloys of one or more base metals with one or more noble metals, copper, copper alloys, and combinations and alloys of two or more of these.

5. The fluid-cooled combustion burner of claim 4 wherein the spin-formed or stamped inner double lap joint comprises a first weld, solder, or braze material, and the spin-formed or stamped outer double lap joint comprises a second weld, solder, or braze material, and wherein the first and second weld, solder, or braze materials may be the same or different.

6. The fluid-cooled combustion burner of claim 5 wherein the first and second weld, solder, or braze materials are independently selected from the group consisting of braze materials within the following table:

| Glass Type | Glass Melt T, (° C.) | Braze Material | Solidus T, (° C.) |
| --- | --- | --- | --- |
| 1 | 1275-1330 | Pt | 1769 |
|  |  | Pd | 1555 |
|  |  | Ti | 1670 |
|  |  | Au/Pd (92/8) | 1200 |
|  |  | Ni/Pd (40/60) | 1238 |
|  |  | Pd/Co (65/35) | 1219 |
|  |  | Pd/Ni/Au (34/36/30) | 1135 |
|  |  | Cu | 1083 |
|  |  | Au | 1064 |
| 2 | 1395-1450 | Pt | 1769 |
|  |  | Pd | 1555 |
|  |  | Ti | 1670 |
|  |  | Au/Pd (92/8) | 1200 |
|  |  | Ni/Pd (40/60) | 1238 |
|  |  | Pd/Co (65/35) | 1219 |
| 3 | 1625 | Pt | 1769 |
|  |  | Ti | 1670 |
| 4 | 1385 | Pt | 1769 |
|  |  | Pd | 1555 |
|  |  | Ti | 1670 |
|  |  | Au/Pd (92/8) | 1200 |
|  |  | Ni/Pd (40/60) | 1238 |
|  |  | Pd/Co (65/35) | 1219 |
|  |  | Pd/Ni/Au (34/36/30) | 1135 | wherein Glass Type 1 is a Na—Ca—Si soda-lime window glass having a melt temperature ranging from about 1275° C. to about 1330° C.; Glass Type 2 is a Al—Ca—Si E glass having low sodium and zero boron, and having melt temperature ranging from about 1395° C. to about 1450° C.; Glass Type 3 is a B—Al—Si glass, having zero sodium, zero potassium, and high Si, and melt temperature about 1625° C.; and Glass Type 4 is a B—Al—Ca—Si E glass used for reinforcement fiber having melt temperature about 1385° C.

7. The fluid-cooled combustion burner of claim 3 wherein the first spin-formed or stamped inner lap joint portion, the second spin-formed or stamped inner lap joint portion, the first spin-formed or stamped outer lap joint portion, and the second spin-formed or stamped outer lap joint portion are formed by spin forming.

8. A submerged combustion melter comprising at least one fluid-cooled combustion burner of claim 7.

9. A submerged combustion melter comprising at least one fluid-cooled combustion burner of claim 3.

10. The fluid-cooled combustion burner of claim 1 comprising a third internal conduit (15) substantially concentric with and positioned internal of the second internal conduit (14).

11. A submerged combustion melter comprising at least one fluid-cooled combustion burner of claim 1.

12. A fluid-cooled combustion burner comprising:
a burner body (6) comprising an external conduit (10) and a first internal conduit (12) substantially concentric therewith, and positioned internal of the external conduit (10), the external conduit (10) comprising a first end, a second end, and a longitudinal bore having a longitudinal axis, the first internal conduit (12) comprising a first end, a second end, and a longitudinal bore having a longitudinal axis, the external conduit (10) and first internal conduit (12) forming a first annulus (11) for passing a cooling fluid there between, and a second internal conduit (14) substantially concentric with, and positioned internal of the first internal conduit (12), the second internal conduit (14) comprising a first end, a second end, and a longitudinal bore having a longitudinal axis, and configured to form a second annulus (13) between the first and second internal conduits (12, 14), and a third internal conduit (15) substantially concentric with and positioned internal of the second internal conduit (14), the burner body comprising fuel and oxidant inlet ports near the second ends of the conduits; and
a spin-formed, one-piece, integral; corrosion resistant and fatigue resistant burner tip (50) defined by a corrosion resistant and fatigue resistant inner wall (28), a corrosion resistant and fatigue resistant outer wall (30), and a corrosion resistant and fatigue resistant crown (32), the corrosion resistant and fatigue resistant outer wall (30) removably fixed to the first end of the external conduit (10) via an outer spin-formed double lap joint, and the corrosion resistant and fatigue resistant inner wall (28) removably fixed to the first end of the second internal conduit (14) via an inner spin-formed double lap joint, the spin-formed, one-piece, integral, corrosion resistant and fatigue resistant burner tip (50) comprising a generally central flow passage configured to pass a combustible mixture therethrough, the generally central flow passage defined by the corrosion resistant and fatigue resistant inner wall (28), at least one of the corrosion and/or fatigue resistance being greater than material comprising the external conduit (10) under conditions experienced during submerged combustion melting of glass-forming materials, wherein the outer spin-formed double lap joint includes the first end of the external conduit (10) curved outwardly, and the inner spin-formed double lap joint includes the first end of the second internal conduit curved outwardly.

13. The fluid-cooled combustion burner of claim 12 wherein
the first and second internal conduits and the external conduit comprise the same or different base materials selected from the group consisting of carbon steel, stainless steel, titanium, nickel-based alloys, and combinations and alloys of two or more of these; and
the spin-formed, one-piece integral, corrosion resistant and fatigue resistant burner tip inner and outer walls and crown comprise the same or different materials selected from the group consisting of noble metals, alloys of two or more noble metals, alloys of one or more base metals with one or more noble metals, copper, copper alloys, and combinations and alloys of two or more of these.

14. The fluid-cooled combustion burner of claim 13 wherein the inner spin-formed double lap joint comprises a first weld, solder, or braze material, and the outer spin-formed double lap joint comprises a second weld, solder, or braze material, and wherein the first and second weld, solder, or braze materials may be the same or different.

15. The fluid-cooled combustion burner of claim 14 wherein the first and second weld, solder, or braze materials are independently selected from the group consisting of braze materials within the following table:

| Glass Type | Glass Melt T, (° C.) | Braze Material | Solidus T, (° C.) |
| --- | --- | --- | --- |
| 1 | 1275-1330 | Pt | 1769 |
|  |  | Pd | 1555 |
|  |  | Ti | 1670 |
|  |  | Au/Pd (92/8) | 1200 |
|  |  | Ni/Pd (40/60) | 1238 |
|  |  | Pd/Co (65/35) | 1219 |
|  |  | Pd/Ni/Au (34/36/30) | 1135 |
|  |  | Cu | 1083 |
|  |  | Au | 1064 |
| 2 | 1395-1450 | Pt | 1769 |
|  |  | Pd | 1555 |
|  |  | Ti | 1670 |
|  |  | Au/Pd (92/8) | 1200 |
|  |  | Ni/Pd (40/60) | 1238 |
|  |  | Pd/Co (65/35) | 1219 |
| 3 | 1625 | Pt | 1769 |
|  |  | Ti | 1670 |
| 4 | 1385 | Pt | 1769 |
|  |  | Pd | 1555 |
|  |  | Ti | 1670 |
|  |  | Au/Pd (92/8) | 1200 |
|  |  | Ni/Pd (40/60) | 1238 |
|  |  | Pd/Co (65/35) | 1219 |
|  |  | Pd/Ni/Au (34/36/30) | 1135 | wherein Glass Type 1 is a Na—Ca—Si soda-lime window glass having a melt temperature ranging from about 1275° C. to about 1330° C.; Glass Type 2 is a Al—Ca—Si E glass having low sodium and zero boron, and having melt temperature ranging from about 1395° C. to about 1450° C.; Glass Type 3 is a B—Al—Si glass, having zero sodium, zero potassium, and high Si, and melt temperature about 1625° C.; and Glass Type 4 is a B—Al—Ca—Si E glass used for reinforcement fiber having melt temperature about 1385° C.

16. A submerged combustion melter comprising at least one fluid-cooled combustion burner of claim 12.

* * * * *